United States Patent
Wu et al.

(10) Patent No.: US 7,446,511 B2
(45) Date of Patent: Nov. 4, 2008

(54) ACTIVE POWER CONDITIONER FOR AC LOAD CHARACTERISTICS

(75) Inventors: Chin-Chang Wu, Kaohsiung (TW);
Hung-Liang Chou, Kaohsiung (TW);
Wen-Pin Hsu, Kaohsiung (TW);
Yu-Ting Kuo, Kaohsiung (TW);
Ya-Tsung Feng, Kaohsiung (TW)

(73) Assignee: Ablerex Electronics Co., Ltd., Taipei Hsien (TW)

( * ) Notice: Subject to any disclaimer, the term of this patent is extended or adjusted under 35 U.S.C. 154(b) by 274 days.

(21) Appl. No.: 11/502,515

(22) Filed: Aug. 11, 2006

(65) Prior Publication Data
US 2007/0076451 A1    Apr. 5, 2007

(30) Foreign Application Priority Data
Oct. 5, 2005    (TW) ............................... 94134800 A

(51) Int. Cl.
*G05F 1/70* (2006.01)
*G05F 1/00* (2006.01)
(52) U.S. Cl. ...................................... 323/207; 323/266
(58) Field of Classification Search .................. 363/34;
323/205, 207, 266, 303
See application file for complete search history.

(56) References Cited

U.S. PATENT DOCUMENTS

| 5,321,598 | A | 6/1994 | Moran |
| 5,329,221 | A * | 7/1994 | Schauder .................... 323/207 |
| 5,614,770 | A | 3/1997 | Suelzle |
| 5,977,660 | A | 11/1999 | Mandalakas et al. |
| 6,381,157 | B2 | 4/2002 | Jensen |
| 7,183,751 | B2 * | 2/2007 | Wu et al. .................... 323/207 |
| 7,301,787 | B2 * | 11/2007 | Wu et al. ....................... 363/39 |

* cited by examiner

*Primary Examiner*—Jessica Han
*Assistant Examiner*—Emily Pham
(74) *Attorney, Agent, or Firm*—Bacon & Thomas, PLLC

(57) ABSTRACT

An active power conditioner, connecting with a load and a power source in parallel, includes a DC power capacitor, a power converter, a high-frequency filter and a control circuit. The control circuit detects the voltage of the DC power capacitor and the current of the power source, thereby performing a closed loop control to stabilize the voltage of the DC power capacitor and performing a feed forward control to generate a driving signal for driving the power converter. The power converter actuates the DC power capacitor to supply a current via the high-frequency filter to reduce the reactive and harmonic components of load current. The load is converted to the linear resistance characteristic, observed from the power source side.

21 Claims, 5 Drawing Sheets

ACTIVE POWER CONDITIONER FOR AC LOAD CHARACTERISTICS

BACKGROUND OF THE INVENTION

1. Field of the Invention

The present invention relates to an active power condition for AC load characteristics. Particularly, the present invention relates to the active power conditioner connected in parallel with the AC loads that are non-linear or contain-reactive power. More particularly, the present invention relates to the active power conditioner applied to adjust the AC loads for performing a linear resistance characteristic so as to reduce harmonic and reactive power currents of the AC loads.

2. Description of the Related Art

Recently, a variety of non-linear loads such as rectifiers, battery chargers, motor drivers and UPS (Uninterruptible Power Supply) have been widely used in a distribution power system. These non-linear loads can generate a great amount of harmonic currents injecting into the distribution power system. This may result in overheating transformers, fluctuations of rotary electric machines, voltage distortion of utility power and damage to electric equipment in the distribution power system.

In order to improve the problems with the harmonic pollution, many harmonic control standards, such as IEEE519-1992, IEC1000-3-2, and IEC1000-3-4 etc., have been established. Many countries have therefore enforced these control standards. There is also established a power control provisional standard for harmonic by Taiwan Power Company in Taiwan. Therefore, how to solve the harmonic problems is an important topic in today's power system worldwide.

On the other hand, many of the loads in the distribution power system are inductive (inductor-type) loads that result in lagging power factor of reactive power. To compensate the lagging reactive power, the distribution power system must further supply reactive power to the loads in addition to real power. Accordingly, it would be disadvantageous that the efficiency of the distribution power system is lowered and the voltage regulation in the load side is poor. Furthermore, it would be also disadvantageous that a larger capacity of the power transmission of the distribution power system is required. In Taiwan, Taiwan Power Company has also urged to reduce the reactive power generated from the users existing in the distribution power system.

As has been explained above, linear loads with a resistance characteristic are preferred in the distribution power system. However, the linear resistance loads only consume real power in the distribution power system and may not produce harmonics. Traditionally, passive electric components are used to form a power conditioner applied in the distribution power system so as to operate the loads for creating a linear resistance characteristic. For example, a passive power filter can reduce harmonic currents produced by the non-linear loads, and improve power factors. A power capacitor set is also used to reduce reactive currents produced by inductive loads. However, there exist some problems with using the passive power conditioner applied to create the linear resistance characteristic. For example, the passive power filter may cause drawbacks of serial/parallel resonance, injection of neighboring harmonic and lower filtering effect; and the power capacitor may also cause drawbacks of serial/parallel resonance, injection of neighboring harmonic, unvaried reactive power compensation and incapability of linear adjustment.

In order to solve the problems with the passive power conditioner for the AC load, the active power conditioner comprising power electronic components, as shown in FIG. 1, has been developed. Traditionally, the active power conditioner (so-called active power filter) includes a DC power capacitor 91, a power converter 92 and a high-frequency filtering circuit 93. In this case, the active power conditioner electrically connects with a load 2 in parallel and operates therewith. A non-linear characteristic of the load 2 can be adjusted and shifted to a linear resistance characteristic by the active power conditioner which can eliminate reactive current and harmonic currents of the load 2. Accordingly, a sinusoidal waveform of a current supplied from a power source 1 has phase identical with those of voltages of the power source 1. Consequently, the characteristic of the load 2 can be conditioned to be a linear resistance characteristic.

An active power conditioner for adjusting AC loads, described in U.S. Pat. Nos. 5,321,598, 5,614,770 and 5,977,660, includes a DC power capacitor, a power converter, a high-frequency filter and a control circuit. In operation, the active power conditioner detects a load current, a power source voltage and a DC capacitor voltage that are calculated in a complicated process to generate a compensation current signal for sending to a feedback controller. An output current of the power converter is further detected and sent to the feedback controller. The feedback controller processes the compensation current signal and the output current of the power converter by means of a closed-loop control. Accordingly, the output current of the power converter can be adjusted to respond to changes of the compensation current signal. Although it would be advantageous that the active power conditioner is, however, successful in reducing harmonics and creating a linear resistance characteristic, constructions of the control circuit are complicated. Hence, there is a need for improving the active power conditioner for the AC loads.

As is described in greater detail below, the present invention intends to provide an active power conditioner for AC load characteristics. This active power conditioner can generate a driving signal for a power converter by detecting a voltage of a DC power capacitor for processing a closed-loop control and detecting a current of a power source for processing a feed forward control. In the present invention, calculation of the compensation current signal and detection of the output current of the power converter are not required. In this manner, the active power conditioner can adjust a non-linear load to be performed a linear resistance characteristic, reduce the harmonic and reactive current and simplify the control circuit.

SUMMARY OF THE INVENTION

The primary objective of this invention is to provide an active power conditioner connecting with a load in parallel and operating therewith. A non-linear characteristic of the load is adjusted to be a linear resistance characteristic and reactive currents are eliminated. The combination of the active power conditioner with the load can be considered as a linear resistance characteristic, observed from a power source side.

The active power conditioner in accordance with an aspect of the present invention connects with the load in parallel, and the combination of the active power conditioner with the load further connects with the power source. The active power conditioner includes a DC power capacitor, a power converter, a high-frequency filter and a control circuit. The DC power capacitor provides a stabilized DC voltage to the power converter. The control circuit is used to detect the voltage of the DC power capacitor, thereby performing a closed loop control to stabilize the voltage of the DC power capacitor. The control circuit is further used to detect the current of the power source, thereby performing a feed-forward control to generate a driving signal for driving the power converter. Once received, the power converter can switch the voltage of the DC power capacitor whose voltage can be sent to the high-frequency filter so as to supply a current. The current supplied from the active power conditioner can reduce the harmonic and reactive currents of the load such that a current supplied from the power source is a sinusoidal waveform and with a phase identical with those of voltage of the power source. Accordingly, the load with the non-linear and reactive characteristic is converted to the linear resistance characteristic, observed from the power source side.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
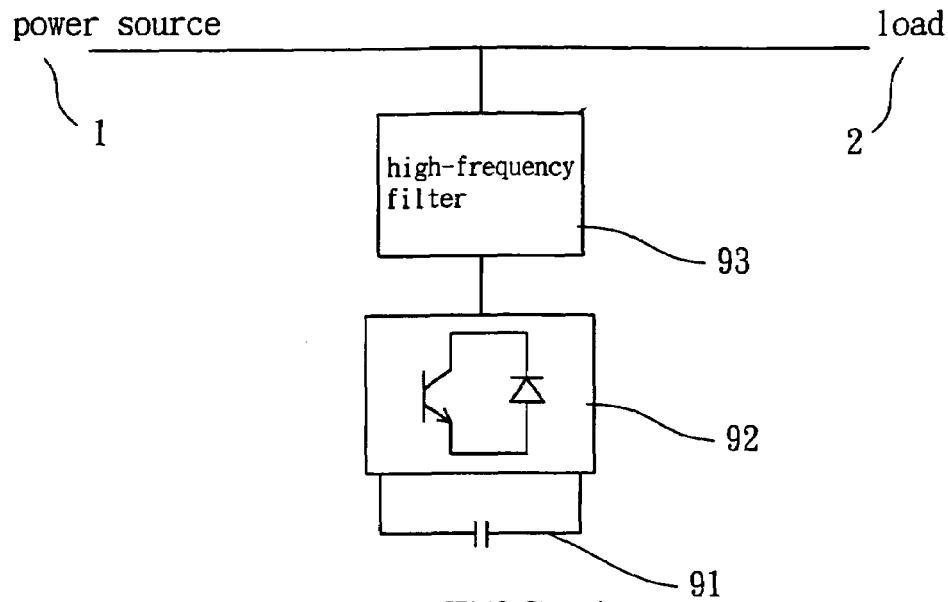
FIG. 1 is a schematic circuitry illustrating a conventional active-type adjusting device for AC loads in accordance with the prior art.
Figure 2:
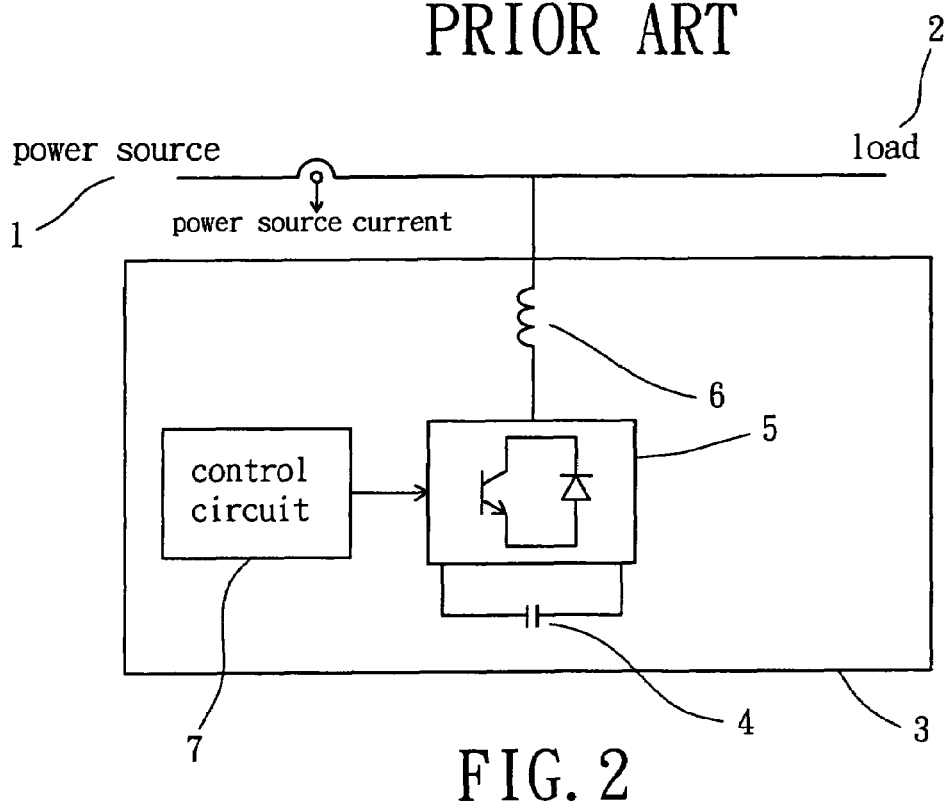
FIG. 2 is a schematic circuitry illustrating an active power conditioner for AC load characteristics in accordance with a first embodiment of the present invention.

Turning now to FIG. 2, a schematic circuitry of an active power conditioner in accordance with a first embodiment of the present invention applied in a distribution power system is illustrated. The distribution power system includes a power source 1, a load 2 and an active power conditioner 3. The power source 1 supplies electric power to the load 2 in the distribution power system. Preferably, the power source 1 is a single-phase power source, a three-phase, three-wire power source or a three-phase, four-wire power source. In the first embodiment, the active power conditioner 3 connects with the load 2 and the power source 1 in parallel. Turning now to FIGS. 3a through 3f, six circuit configurations of power converter for the active power conditioner in accordance with the first embodiment of the present invention are illustrated. By referring to FIGS. 2 and 3a through 3f, the active power conditioner 3 of the first embodiment includes a DC power capacitor 4, a power converter 5, a high-frequency filter 6 and a control circuit 7. The DC power capacitor 4 is used to build a stabilized DC voltage, and acts as an energy buffer of the active power conditioner 3. As shown in FIGS. 3a through 3f, the power converter 5 comprises power electronic switches which configure a bridge structure. The power converter 5 has a DC side connected with the DC power capacitor 4, and an AC side.

Figure 3A:
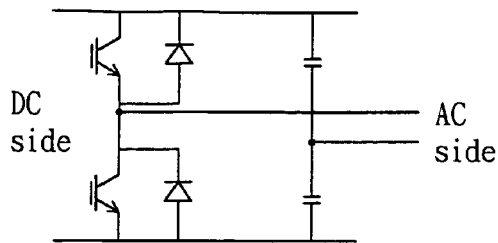
FIG. 3a is a schematic circuitry illustrating a single-phase power converter of the active power conditioner in accordance with the first embodiment of the present invention.
Figure 3B:
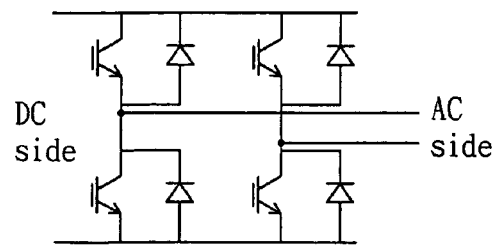
FIG. 3b is a schematic circuitry illustrating another single-phase power converter of the active power conditioner in accordance with the first embodiment of the present invention.
Figure 3C:
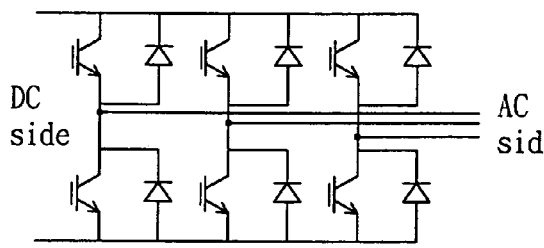
FIG. 3c is a schematic circuitry illustrating a three-phase, three-wire power converter of the active power conditioner in accordance with the first embodiment of the present invention.
Figure 3D:
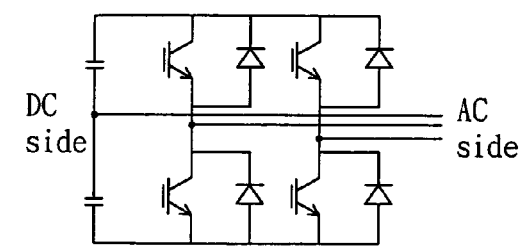
FIG. 3d is a schematic circuitry illustrating another three-phase, three-wire power converter of the active power conditioner in accordance with the first embodiment of the present invention.
Figure 3E:
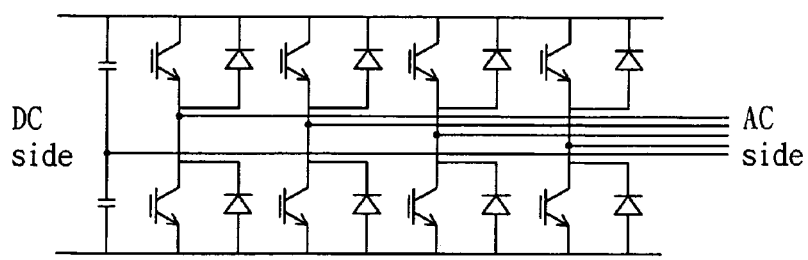
FIG. 3e is a schematic circuitry illustrating a three-phase, four-wire power converter of the active power conditioner in accordance with the first embodiment of the present invention.
Figure 3F:
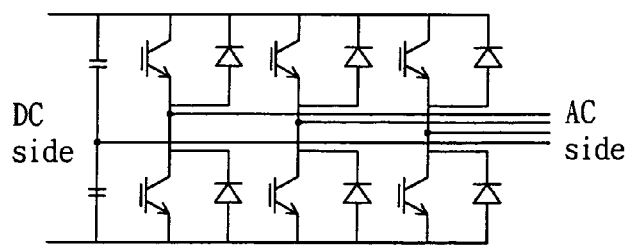
FIG. 3f is a schematic circuitry illustrating another three-phase, four-wire power converter of the active power conditioner in accordance with the first embodiment of the present invention.

By referring to FIGS. 3a and 3b, if the power source 1, as best shown in FIG. 2, is a single-phase power source, the single-phase power converter 5 is designed to have a DC side and an AC side, wherein two output lines are arranged at the AC side. By referring to FIGS. 3c and 3d, if the power source 1, as best shown in FIG. 2, is a three-phase, three-wire power source, the three-phase, three-wire power converter 5 is also designed to have a DC side and an AC side, wherein three output lines are arranged at the AC side. By referring to FIGS. 3e and 3f, if the power source 1, as best shown in FIG. 2, is a three-phase, four-wire power source, the three-phase, four-wire power converter 5 is also designed to have a DC side and an AC side, wherein four output lines are arranged at the AC side.

Referring back to FIG. 2, the high-frequency filter 6 is an inductor set that connects with the AC side of the power converter 5. The high-frequency filter 6 is used to filter high-frequency harmonics caused by the switching operation of the power converter 5. The control circuit 7 is used to turn on or off the power electronic switches of the power converter 5. Turning on or off the power electronic switches of the power converter 5 can switch the voltage of the DC power capacitor 4 so that the power converter 5 can supply a current via the high-frequency filter 6. The current supplied from the active power conditioner 3 can reduce the harmonic and reactive currents of the load such that a current supplied from the power source 1 is a sinusoidal waveform and approximates in phase with the voltage of the power source 1. Accordingly, the load 2 with the non-linear and reactive characteristic is converted to the linear resistance characteristic, observed from the power source side.

Figure 4:
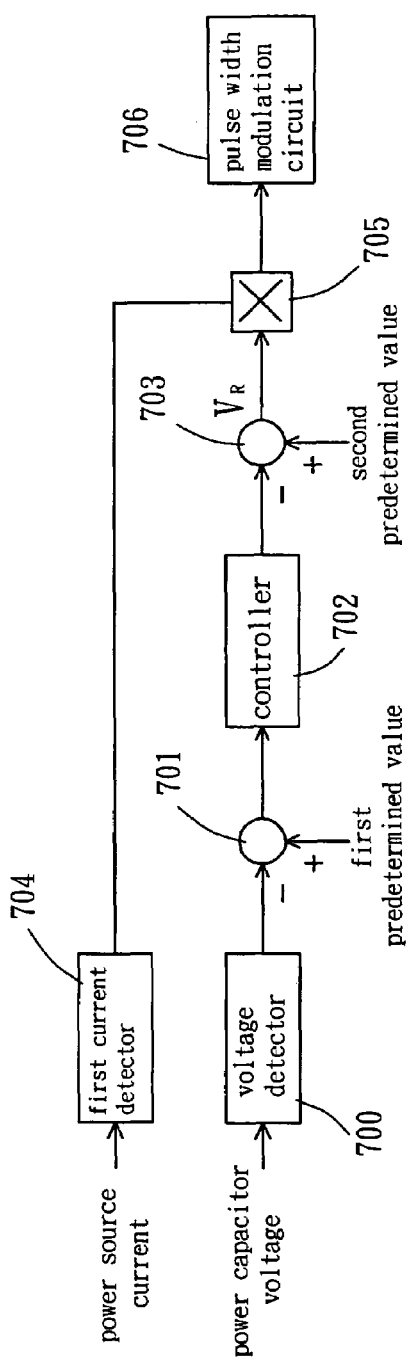
FIG. 4 is a block diagram illustrating a control circuit of the active power conditioner in accordance with the first embodiment of the present invention, depicted in FIG. 2.

Turning now to FIG. 4, a block diagram of the control circuit 7 of the active power conditioner 3, depicted in FIG. 2, in accordance with the first embodiment of the present invention is illustrated. Referring to FIGS. 2 and 4, the control circuit 7 of the active power conditioner 3 includes a voltage detector 700, a first subtractor 701, a controller 702, a second subtractor 703, a first current detector 704, a multiplier 705 and a pulse width modulation circuit 706. In the control circuit 7, the voltage detector 700 detects the voltage of the DC power capacitor 4, and sends it to the first subtractor 701. The voltage of the DC power capacitor 4 from the voltage detector 700 and a first predetermined value are subtracted in the first subtractor 701, and the result of the first subtractor 701 is sent to the controller 702. Subsequently, the output of the controller 702 and a second predetermined value are sent to the second subtractor 703, and the subtracted result is a control signal identified as "$V_R$". The control signal "$V_R$" is a desired control signal of the power converter 5 which is an equivalent linear resistance of a parallel connection of the active power conditioner 3 and the load 2. Preferably, the first predetermined value is identical with an expected value of the voltage of the DC power capacitor 4. The expected value of the voltage of the DC power capacitor 4 can be changed by adjusting the first predetermined value. The active power conditioner 3 and the load 2 are connected in parallel so that the active power conditioner 3 can condition the load 2 to have a linear resistance characteristic. When the equivalent resistance of the active power conditioner 3 and the load 2 is increased, the real power absorbed by the active power conditioner 3 and the load 2 may be decreased. The equivalent resistance of the active power conditioner 3 and the load 2 is apparently inverse proportional to the absorbed real power. Accordingly, the output of the controller 702 must be proportional to the required real power so that the equivalent resistance value of the active power conditioner 3 and the load 2 can be obtained by subtracting the output of the controller 702 from the second predetermined value. However, the second predetermined value equals the maximum value of the equivalent resistance of the active power conditioner 3 and the load 2; namely, that is the minimum value of the real power absorbed by the active power conditioner 3 and the load 2.

Still referring to FIGS. 2 and 4, the first current detector 704 of the control circuit 7 is used to detect a current of the power source 1. The detected current of the power source 1 and the control signal "$V_R$" are sent to the multiplier 705 and multiplied therein. Subsequently, the result of the multiplier 705 is further sent to the pulse width modulation circuit 706 to generate a driving signal. In operation, the driving signal generated by the pulse width modulation circuit 706 is sent to the power converter 5 to drive the power electronic switches which can switch the voltage of the DC power capacitor 4 to supply a current via the high-frequency filter 6. Finally, the current supplied from the active power conditioner 3 can reduce the harmonic and reactive currents of the load 2 such that a current supplied from the power source 1 is a sinusoidal waveform and approximates in phase with the voltage of the power source 1. Accordingly, the active power conditioner can condition the load 2 with the non-linear and reactive characteristic to have the linear resistance characteristic, observed from the power source side. Consequently, it would be advantageous that the power factor is approximately unity, and harmonic currents can thus be filtered.

Still referring to FIG. 4, the control circuit 7 applied in the active power conditioner 3 is simplified. When the load 2 is heavy load, the control signal "$V_R$" generated from the second subtractor 703 is relatively small such that the real power absorbed by the active power conditioner 3 and the load 2 is relatively larger. However, the equivalent resistor of the active power conditioner 3 and the load 2 is relatively small under both harmonic frequencies and fundamental frequency. The relatively small of equivalent resistor under harmonic frequencies allows an injection of the larger harmonic current that results in a significant distortion of the current supplied from the power source 1.

Figure 5:
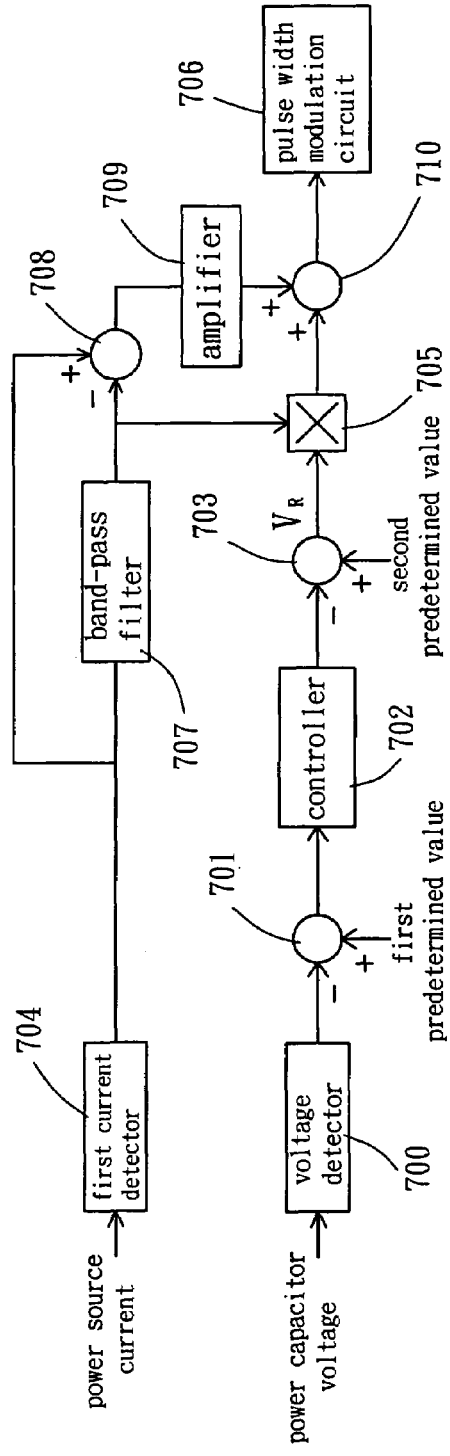
FIG. 5 is a block diagram illustrating a control circuit of the active power conditioner in accordance with a second embodiment of the present invention.

Turning now to FIG. 5, a block diagram of a control circuit of the active power conditioner in accordance with a second embodiment of the present invention is illustrated. Reference numerals of the second embodiment of the present invention have applied the identical numerals of the first embodiment, as shown in FIG. 4. In comparison with the first embodiment, the control circuit 7 of the second embodiment also includes the voltage detector 700, first subtractor 701, controller 702, second subtractor 703, first current detector 704, multiplier 705 and pulse width modulation circuit 706. The control signal "$V_R$" generated by the second subtractor 703 is similar to that described in the first embodiment and the detailed descriptions may be omitted. The control circuit 7 of the second embodiment further includes a band-pass filter 707, a third subtractor 708, an amplifier 709 and an adder 710 which are connected with the first current detector 704, multiplier 705 and pulse width modulation circuit 706. In the second embodiment, the band-pass filter 707, third subtractor 708, amplifier 709 and adder 710 are applied to detect the current of the power source 1 in a different manner.

Referring to FIG. 5, the first current detector 704 detects the current of the power source 1 and then sends the detected current to the band-pass filter 707 for retrieving the fundamental component of the detected current. Subsequently, the output of the band-pass filter 707 and the control signal "$V_R$" of the second subtractor 703 are sent to the multiplier 705 and multiplied therein. The output of the band-pass filter 707 is further sent to the third subtractor 708 and substracted it from the detected current of the first current detector 704 for retrieving harmonic components of the detected current of the power source 1. Subsequently, the result of the third subtractor 708 is sent to the amplifier 709 and amplified therein. Next, the outputs of the amplifier 709 and multiplier 705 are sent to the adder 710 and added therein. Subsequently, the result of the adder 710 is further sent to the pulse width modulation circuit 706 to generate driving signals for driving the power electronic switches which can switch the voltage of the DC power capacitor 4 to supply a current via the high-frequency filter 6. Finally, the current supplied by the active power conditioner 3 can reduce the harmonic and reactive currents of the load 2 such that a current supplied from the power source 1 is a sinusoidal waveform and approximates in phase with the voltage of the power source 1. Accordingly, the load 2 with the non-linear and reactive characteristic is converted to the linear resistance characteristic, observed from the power source side. Consequently, it would be advantageous that the power factor is approximately unity, and harmonic currents can thus be filtered.

Still referring to FIG. 5, the active power conditioner 3 of the second embodiment is used to separately process the fundamental and harmonic components of the detected current of the power source 1. This may result in the complicated control circuit 7 even though such a complicated structure is unwanted. Nevertheless, the control signal "$V_R$" of the second subtractor 703 only controls the fundamental component of the equivalent resistor of the active power conditioner 3 and the load 2. On the other hand, the harmonic components of the equivalent resistor appear a fixed value that may not be affected by changes in the load 2. Advantageously, there is a relatively smaller distortion of the current supplied from the power source 1 regardless of the light or heavy load 2.

Figure 6:
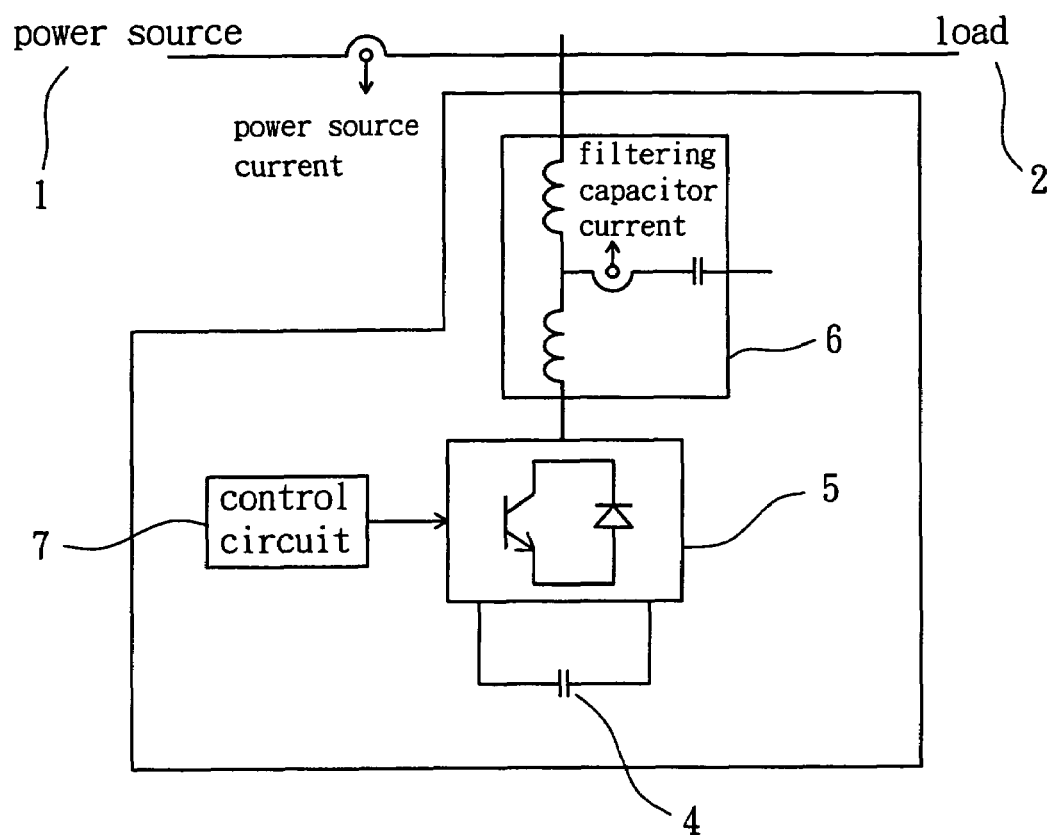
FIG. 6 is a schematic circuitry illustrating the active power conditioner in accordance with a third embodiment of the present invention.

Turning now to FIG. 6, a schematic circuitry of the active power conditioner in accordance with a third embodiment of the present invention applied in a distribution power system is illustrated. Reference numerals of the third embodiment of the present invention have applied the identical numerals of the first embodiment, as shown in FIGS. 2 and 4. In comparison with the first embodiment, the active power conditioner 3 of the third embodiment also includes the DC power capacitor 4, power converter 5, high-frequency filter 6 and control circuit 7. The DC power capacitor 4 is used to build a stabilized DC voltage, and acts as an energy buffer device of the active power conditioner 3. By referring to FIGS. 3a through 3f, the power converter 5 comprises power electronic switches which are connected in a bridge structure. The power converter 5 may be a single-phase power converter, a three-phase, three-wire power converter and a three-phase, four-wire power converter. The power converter 5 has a DC side connected with the DC power capacitor 4, and an AC side. In a preferred embodiment, the high-frequency filter 6 is an inductor-capacitor-inductor set (i.e. L-C-L filter) which has a lower inductance suitable for applying in medium or large capacity that may reduce volumes, weight and manufacturing cost of the high-frequency filter 6. The high-frequency filter 6 connecting with the AC side of the power converter 5 has the function to filter high-frequency harmonics caused by the switching operation of the power converter 5. The control circuit 7 is used to turn on or off the power electronic switches of the power converter 5. Turning on or off the power electronic switches of the power converter 5 can switch the voltage of the DC power capacitor 4 that can supply a current via the high-frequency filter 6. The current supplied from the active power conditioner 3 can reduce the harmonic and reactive currents of the load 2 such that a current supplied from the power source 1 is a sinusoidal waveform and approximates in phase with the voltage of the power source 1. Accordingly, the load 2 with non-linear and reactive characteristic is converted to the linear resistance characteristic, observed from the power source side.

Figure 7:
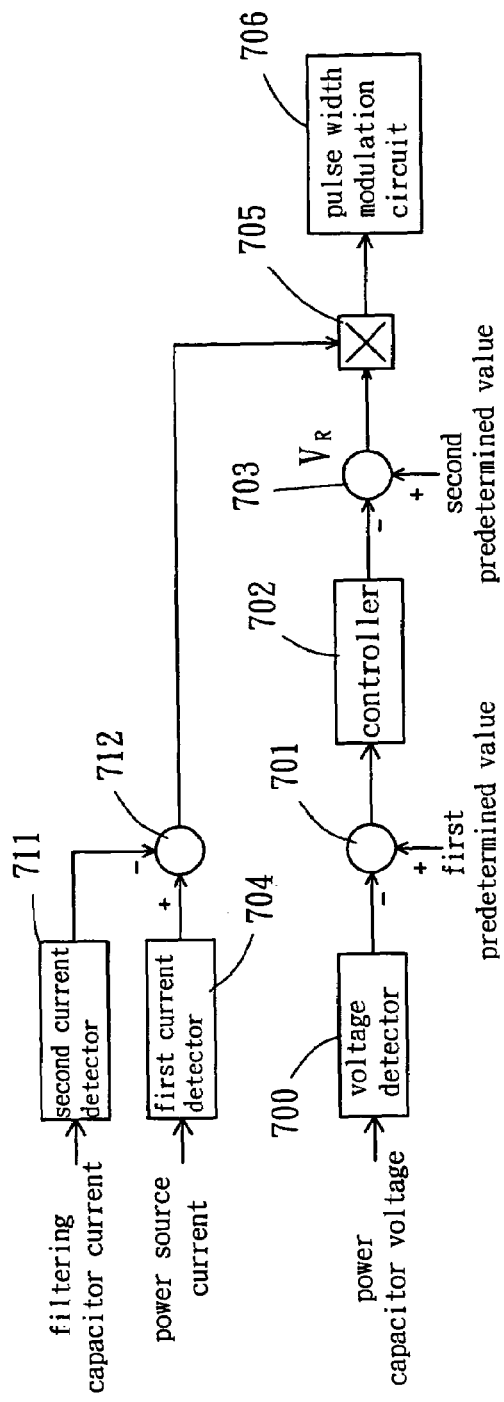
FIG. 7 is a block diagram illustrating a control circuit of the active power conditioner in accordance with the third embodiment of the present invention, depicted in FIG. 6.

Turning now to FIG. 7, a block diagram of a control circuit of the active power conditioner 3, depicted in FIG. 6, in accordance with the third embodiment of the present invention is illustrated. By referring to FIGS. 6 and 7, the control circuit 7 of the third embodiment also includes the voltage detector 700, first subtractor 701, controller 702, second subtractor 703, first current detector 704, multiplier 705 and pulse width modulation circuit 706. In the third embodiment, the control circuit 7 of the third embodiment further includes a second current detector 711 and a fourth subtractor 712 which are connected between the first current detector 704 and multiplier 705. In the third embodiment, the voltage detector 700 detects the voltage of the DC power capacitor 4, and sends it to the first subtractor 701. The voltage of the DC power capacitor 4 sent from the voltage detector 700 and a first predetermined value are subtracted in the first subtractor 701, and the result of the first subtractor 701 is sent to the controller 702. Subsequently, the output of the controller 702 and a second predetermined value are sent to the second subtractor 703, and the subtracted result is a control signal identified as "$V_R$". The control signal "$V_R$" is a desired control signal of the power converter 5 which is an equivalent linear resistance of a parallel connection of the load 2. Preferably, the first predetermined value is identical with an expected value of the voltage of the DC power capacitor 4. The expected value of the voltage of the DC power capacitor 4 can be changed by adjusting the first predetermined value. The active power conditioner 3 and the load 2 are connected in parallel so that the active power conditioner 3 can condition the load 2 to have a linear resistance characteristic. When the resistance of the equivalent resistor is increased, the real power absorbed by the active power conditioner 3 and the load 2 may be decreased. The equivalent resistance is apparently inverse proportional to the absorbed real power. The output of the controller 702 must be proportional to the required real power so that the resistance value of the equivalent resistor can be obtained by subtracting the output of the controller 702 from the second predetermined value. However, the second predetermined value equals the maximum of the resistance of the equivalent resistor; namely, that is the minimum of the real power absorbed by the active power conditioner 3 and the load 2.

Still referring to FIGS. 6 and 7, the capacitor existing in the high-frequency filter 6 may cause high frequency oscillations if the current of the power source 1 is only detected in the active power conditioner 3 of the third embodiment due to the construction of the inductor-capacitor-inductor set. In the third embodiment, the first current detector 704 is used to detect a current of the power source 1 and the second current detector 711 is used to detect a current of the filtering capacitor of the high-frequency filter 6. The detected currents of the power source 1 and the filtering capacitor are sent to the fourth subtractor 712 and the detected current of the filtering capacitor is subtracted from that of the power source 1. Consequently, no oscillation may occur in the high-frequency filter 6 since an affection of the filtering capacitor is eliminated. The result of the fourth subtractor 712 and the control signal "$V_R$" are sent to the multiplier 705 and multiplied therein. Subsequently, the result of the multiplier 705 is further sent to the pulse width modulation circuit 706 to generate the driving signals. In operation, the driving signals generated from the pulse width modulation circuit 706 are sent to the power converter 5 to drive the power electronic switches which can switch the voltage of the DC power capacitor 4 to supply a current via the high-frequency filter 6. Finally, current supplied from the active power conditioner 3 can reduce the harmonic and reactive currents of the load 2 such that a current supplied from the power source 1 is a sinusoidal waveform and approximates in phase 1 with the voltage of the power source 1. Accordingly, the load 2 with the non-linear and reactive characteristic is converted to the linear resistance characteristic, observed from the power source side. Consequently, it would be advantageous that the power factor is approximately unity, and harmonic currents can thus be filtered.

Still referring to FIGS. 6 and 7, the control circuit 7 of the third embodiment applied in the active power conditioner 3 is simplified in constructions. When the load 2 is heavy load, the control signal "$V_R$" generated from the second subtractor 703 is relatively small such that the real power absorbed by the active power conditioner 3 and the load 2 is relatively larger. However, the equivalent resistor of the active power conditioner 3 and the load 2 is relatively small under both harmonic frequencies and fundamental frequency in this condition. The relatively small of equivalent resistor under harmonic frequencies allows an injection of the larger harmonic current that results in a larger distortion of the current supplied from the power source 1.

Figure 8:
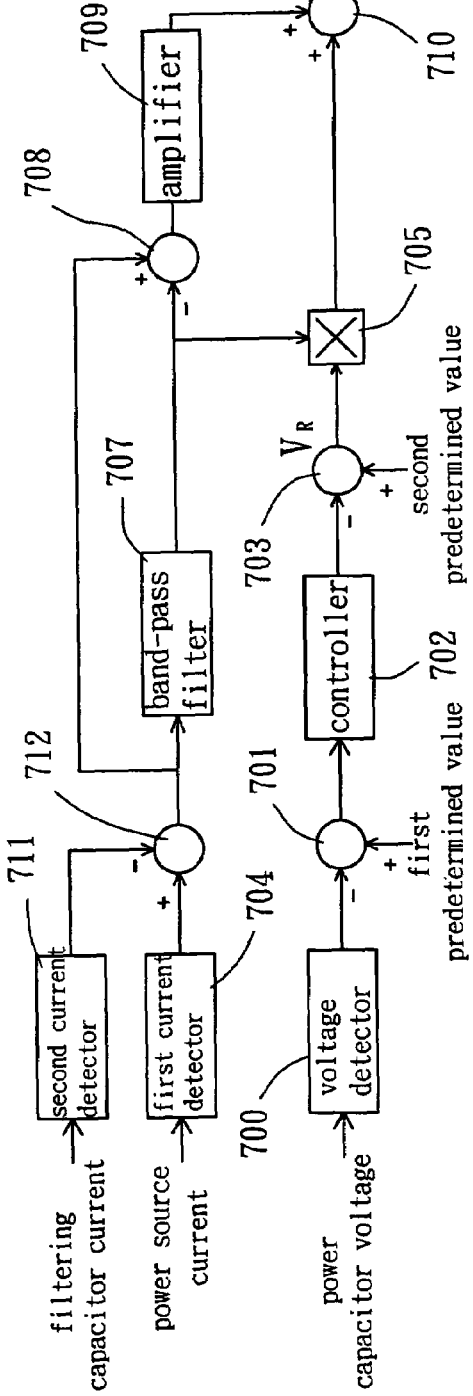
FIG. 8 is a block diagram illustrating a control circuit of the active power conditioner in accordance with a fourth embodiment of the present invention.

Turning now to FIG. 8, a block diagram of a control circuit of the active power conditioner 3 in accordance with the fourth embodiment of the present invention is illustrated. Reference numerals of the fourth embodiment of the present invention have applied the identical numerals of the second and third embodiments, as shown in FIGS. 5 and 7. In comparison with the second embodiment, the control circuit 7 of the fourth embodiment also includes the voltage detector 700, first subtractor 701, controller 702, second subtractor 703, first current detector 704, multiplier 705, pulse width modulation circuit 706, band-pass filter 707, third subtractor 708, amplifier 709 and adder 710. The control signal "$V_R$" generated from the second subtractor 703 is similar to that described in the third embodiment and the detailed descriptions may be omitted. In comparison with the third embodiment, the control circuit 7 of the fourth embodiment also includes the second current detector 711 and fourth subtractor 712 which are connected between the first current detector 704 and band-pass filter 707.

Still referring to FIG. 8, in the fourth embodiment, the first current detector 704 is used to detect a current of the power source 1 and the second current detector 711 is used to detect a current of the filtering capacitor of the high-frequency filter 6. The detected currents of the power source 1 and the filtering capacitor are sent to the fourth subtractor 712 and the detected current of the filtering capacitor is subtracted from that of the power source 1. Next, the result of the fourth subtractor 712 is sent to the band-pass filter 707 for retrieving fundamental component of the result of the fourth subtractor 712. Subsequently, the output of the band-pass filter 707 and the control signal "$V_R$" of the second subtractor 703 are sent to the multiplier 705 and multiplied therein. The output of the band-pass filter 707 and the result of the fourth subtractor 712 are further sent to the third subtractor 708 to retrieve the harmonic components from the output of the third subtractor 708. Subsequently, the result of the third subtractor 708 is sent to the amplifier 709 and amplified therein. Next, the outputs of the amplifier 709 and multiplier 705 are sent to the adder 710 and added therein. Subsequently, the result of the adder 710 is further sent to the pulse width modulation circuit 706 to generate the driving signals for driving the power electronic switches which can switch the voltage of the DC power capacitor 4 to supply a current to the load 2 via the high-frequency filter 6. Finally, the current supplied from the active power conditioner 3 can reduce the harmonic and reactive currents of the load 2 such that a current supplied from the power source 1 is a sinusoidal waveform and approximates in phase with the voltage of the power source 1. Accordingly, the load 2 with the non-linear and reactive characteristic is converted to the linear resistance characteristic, observed from the power source side. Consequently, it would be advantageous that the power factor is approximately unity, and harmonic currents can thus be filtered.

Referring again to FIGS. 6 and 8, the active power conditioner 3 of the fourth embodiment is used to separately process the fundamental and harmonic components of the result of subtracting the detected current of the filtering capacitor from the detected current of the power source 1. This may result in the complicated control circuit 7 even though such a complicated structure is unwanted. Nevertheless, the control signal "$V_R$" of the controller 702 only controls the fundamental component of the equivalent resistor of the active power conditioner 3 and the load 2. On the other hand, the harmonic components of the equivalent 1 resistor appear a fixed value that may not be affected by changes in the load 2. Advantageously, there is a relatively smaller distortion of the current supplied from the power source 1 regardless of the light or heavy load 2.

As has been discussed above, the conventional active-type adjusting device for the AC load has a complicated structure in the control circuit. Conversely, the active power conditioner 3 can detect the voltage of the DC power capacitor 4 for performing a closed-loop control, and detect the current of the power source 1 for performing a feed forward control. In the present invention, calculation of the compensation current signal and detection of the output current of the power converter 5 applied in the conventional active-type adjusting device are not required. In this manner, the active power conditioner 3 can adjust a non-linear load to be performed a linear resistance characteristic, reduce the reactive power and simplify constructions of the control circuit 7.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An active power conditioner, said active power conditioner connected with a load and a power source in parallel, comprising:
a DC power capacitor providing a stabilized dc voltage;
a power converter configured by a bridge power electronic switch set, the power converter having a DC side connected with the DC power capacitor, and an AC side;
a high-frequency filter connected with the AC side of the power converter, the high-frequency filter filtering high-frequency harmonics caused by switching operation of the power converter; and
a control circuit controlling the power electronic switch set of the power converter, the control circuit only detecting a voltage of the DC power capacitor and a current of the power source to generate driving signals for the power converter;
wherein the driving signals generated from the control circuit actuates the power electronic switch set of the power converter to switch the voltage built by the DC power capacitor that supplies a current via the high-frequency filter, the current supplied from the active power conditioner reduces the harmonic and reactive currents of the load such that a current supplied from the power source is a sinusoidal waveform and approximates in phase with the voltage of the power source.

2. The active power conditioner as defined in claim 1, wherein the power converter is a single-phase power converter, a three-phase, three-wire power converter or a three-phase, four-wire power converter.

3. The active power conditioner as defined in claim 1, wherein the control circuit detects the voltage of a DC power capacitor for performing a closed-loop control, and detects the current of the power source for performing a feed forward control.

4. The active power conditioner as defined in claim 1, wherein the high-frequency filter is an inductor set.

5. The active power conditioner as defined in claim 4, wherein the control circuit includes a voltage detector, a first subtractor, a controller, a second subtractor, a current detector, a multiplier and a pulse width modulation circuit.

6. The active power conditioner as defined in claim 5, wherein the voltage detector is used to detect the voltage of the DC power capacitor.

7. The active power conditioner as defined in claim 5, wherein the current detector is used to detect the current of the power source.

8. The active power conditioner as defined in claim 4, wherein the control circuit includes a voltage detector, a first subtractor, a controller, a second subtractor, a current detector, a band-pass filter, a multiplier, a third subtractor, an amplifier, an adder and a pulse width modulation circuit.

9. The active power conditioner as defined in claim 8, wherein the voltage detector is used to detect the voltage of the DC power capacitor.

10. The active power conditioner as defined in claim 8, wherein the current detector is used to detect the current of the power source.

11. The active power conditioner as defined in claim 8, wherein the active power conditioner is used to separately process fundamental and harmonic components of the detected current of the power source.

12. The active power conditioner as defined in claim 1, wherein the high-frequency filter is an inductor-capacitor-inductor set.

13. The active power conditioner as defined in claim 12, wherein the control circuit includes a voltage detector, a first subtractor, a controller, a second subtractor, a first current detector, a second current detector, a third subtractor, a multiplier, a fourth subtractor, an amplifier, an adder and a pulse width modulation circuit.

14. The active power conditioner as defined in claim 13, wherein the voltage detector is used to detect the voltage of the DC power capacitor.

15. The active power conditioner as defined in claim 13, wherein the first current detector is used to detect the current of the power source.

16. The active power conditioner as defined in claim 13, wherein the second current detector is used to detect a current of a filtering capacitor of the high-frequency filter.

17. The active power conditioner as defined in claim 12, wherein the control circuit includes a voltage detector, a first subtractor, a controller, a second subtractor, a first current detector, a second current detector, a third subtractor, a band-pass filter, a multiplier, a fourth subtractor an amplifier and a pulse width modulation circuit.

18. The active power conditioner as defined in claim 17, wherein the voltage detector is used to detect the voltage of the DC power capacitor.

19. The active power conditioner as defined in claim 17, wherein the first current detector is used to detect the current of the power source.

20. The active power conditioner as defined in claim 17, wherein the second current detector is used to detect a current of a filtering capacitor of the high-frequency filter.

21. The active power conditioner as defined in claim 17, wherein the active power conditioner is used to separately process fundamental and harmonic components of a subtracted result of detected currents of the power source and a filtering capacitor of the high-frequency filter.

\* \* \* \* \*